United States Patent
Hirai et al.

(10) Patent No.: US 6,647,102 B2
(45) Date of Patent: Nov. 11, 2003

(54) DATA COMMUNICATION APPARATUS CAPABLE OF EXECUTING DEMONSTRATION OPERATION

(75) Inventors: Yoshiyuki Hirai, Ibaraki (JP); Teruyuki Nishii, Chiba (JP)

(73) Assignee: Canon, Inc., Tokyo (JP)

( * ) Notice: Subject to any disclaimer, the term of this patent is extended or adjusted under 35 U.S.C. 154(b) by 151 days.

(21) Appl. No.: 09/934,853

(22) Filed: Aug. 23, 2001

(65) Prior Publication Data

US 2002/0054369 A1 May 9, 2002

(30) Foreign Application Priority Data

Aug. 29, 2000 (JP) .......................................... 2000-259126

(51) Int. Cl.$^7$ .............................................. H04M 11/00
(52) U.S. Cl. .................................... 379/100.01; 358/400
(58) Field of Search .......... 379/100.01, 100.03–100.06; 358/400, 401, 404, 442, 468

(56) References Cited

U.S. PATENT DOCUMENTS 5,442,687 A * 8/1995 Miller .................... 379/100.01
5,535,266 A   7/1996 Nishii ........................ 379/100

* cited by examiner

Primary Examiner—Wing Chan
(74) Attorney, Agent, or Firm—Fitzpatrick, Cella, Harper and Scinto

(57) ABSTRACT

When it is discriminated that a facsimile apparatus is not connected to a telephone line, even if the power of the facsimile apparatus is turned on, then a predetermined time is elapsed, a demonstration operation using a display unit and a speaker included in an operation unit is to be automatically started in accordance with demo patterns stored in a ROM. Then, the demonstration is once stopped by a manual operation of the facsimile apparatus according to the use of the operation unit, a handset or the like. Accordingly, a data communication apparatus such as the facsimile apparatus or the like which is used to be connected to the telephone line is made to perform the demonstration operation easily, and the demonstration operation can be stopped when it is not required.

7 Claims, 5 Drawing Sheets

DATA COMMUNICATION APPARATUS CAPABLE OF EXECUTING DEMONSTRATION OPERATION

BACKGROUND OF THE INVENTION

1. Field of the Invention

The present invention relates to a data communication apparatus having a demonstration function for executing a demonstration operation, and a control method thereof.

2. Related Background Art

Hitherto, a demonstration for the purpose of making a product noticeable has sometimes been performed at a shop or the like for the purpose of sales promotion or the like.

Conventionally, in order to make a product perform a demonstration not performed in an ordinary use such as a specific display, a specific audio output or the like, an ON/OFF operation of the demonstration was switched by operating patterns thereof according to a specific operation or being connected to a specific component used for the demonstration.

However, in a case of selecting whether or not the demonstration is started, since the specific operation or the specific component was required, there occurred the following problem: it was required to memorize an operation method of the specific operation, and the work of performing the operation was difficult.

SUMMARY OF THE INVENTION

An object of the present invention is to improve a data communication apparatus in order to provide a data communication apparatus capable of eliminating the above-mentioned problems.

Another object of the present invention is to provide a data communication apparatus which can automatically start a demonstration operation.

Still another object of the present invention is to make a data communication apparatus which is used by connecting to a telephone line perform a demonstration easily without a complex operation and not perform the demonstration when it is not required.

The above and other objects, features and advantages of the present invention will become more fully apparent from the detailed description based on the following drawings.

DETAILED DESCRIPTION OF THE PREFERRED EMBODIMENT

Hereinafter, an embodiment of the present invention will be described with reference to the attached drawings.

Overall Structure of Apparatus

Figure 1:
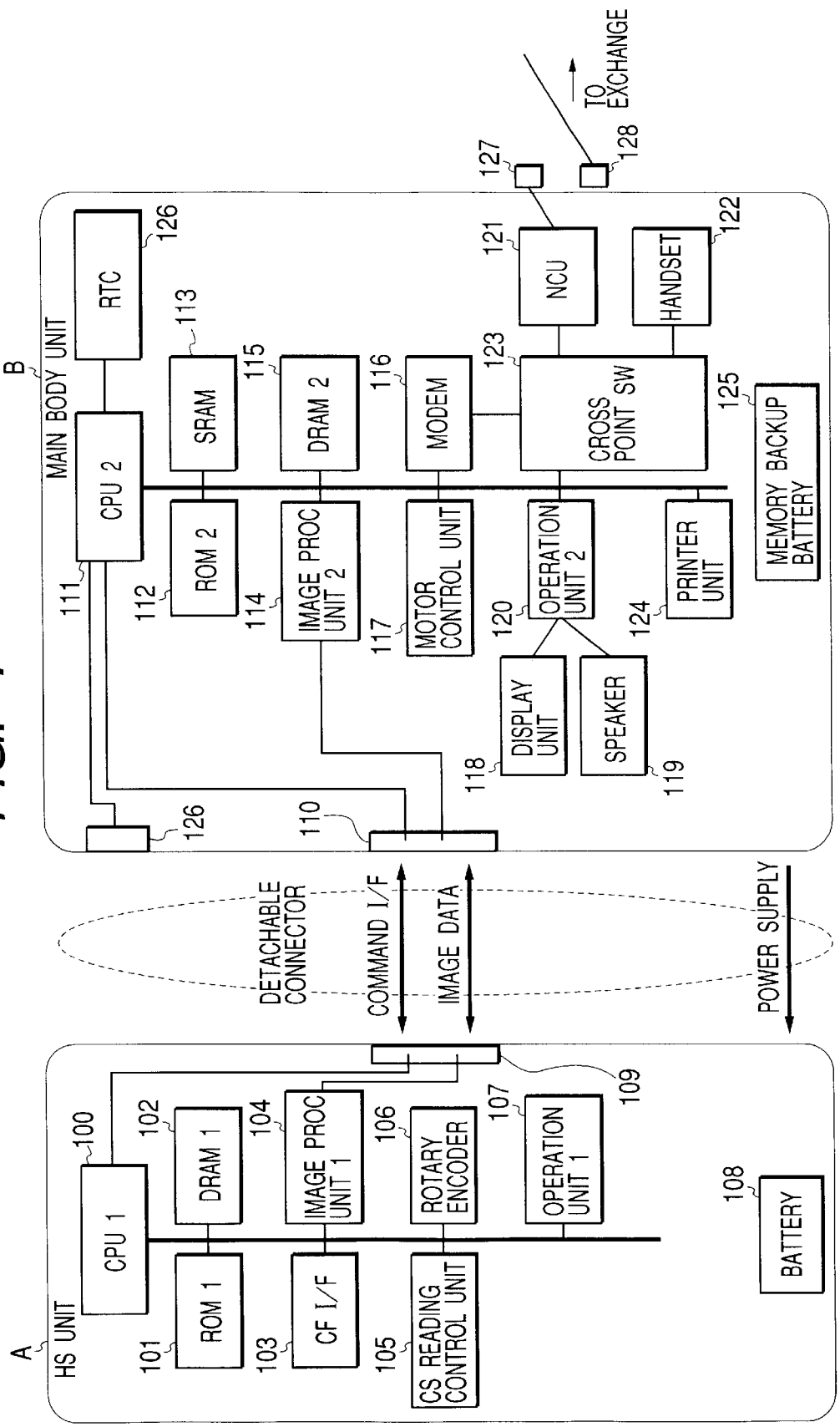
FIG. 1 is a block diagram showing the schematic structure of a facsimile apparatus according to an embodiment of the present invention.

FIG. 1 is a block diagram showing the schematic structure of a facsimile apparatus according to the present embodiment. This facsimile apparatus adopts a cordless hand scanner (hereinafter, called an "HS unit A") as an original reading mechanism. Images on originals can be read by the HS unit A completely separate from a main body unit B.

First, the HS unit A shown in FIG. 1 will be explained.

Numeral 100 denotes a CPU (central processing unit) 1 which is a control unit of the HS (hand scanner) unit A in the facsimile apparatus. Numeral 101 denotes a ROM (read-only memory) 1 for storing various programs or fixed data of the CPU 1. Numeral 102 denotes a DRAM (dynamic random-access memory) 1 which is used as a work memory of the various programs of the CPU 1 or an accumulation memory for accumulating image data or the like in the HS unit A. Numeral 103 denotes a CF interface unit for taking an electrical interface with a throttle for equipping a compact flash memory card (hereinafter, called a CF memory card) used for storing image data for a personal computer, a digital camera or the like. Numeral 104 denotes an image processing unit 1 being an image processing gate array chip having a resolution converting function such as magnification or reduction of images required in image processing executed in the HS unit A and a binarization processing function for converting multi-level image data into binary image data. Numeral 105 denotes a contact sensor (hereinafter, called a CS) reading control unit for reading image data with a line unit from a contact type color image sensor for outputting data of R, G and B colors in linear order with the resolution of 8 pel/mm in a main scanning direction. Numeral 106 denotes a detection output unit of a rotary encoder for observing rotational status of a reading roller in the HS unit A. In case of reading an image, the CPU 1 calculates movement distance data (rotation number information of the rotary encoder) of the HS unit A according to the detection output so as to perform image reading by using the CS reading control unit 105. Numeral 107 denotes an operation unit 1, which is an operation unit of the HS unit A, performs a user operation such as an operation of displaying status of the HS unit A, selection of a reading mode, deletion of image data in a memory or the like by a control of the CPU 1. A battery 108, which is used for driving an entire system of the HS unit A when it is separated from the main body unit and is independently used, is an HS battery of being charged by constantly receiving power supply from the main body unit in a state that the HS unit A is equipped to the main body unit.

Signal interface units 109 and 110, which are included in a detachable connector between the HS unit A and the main body unit B, are structured by a command interface for interactively performing a designation of an operation mode or a communication of status information and an image data interface for interactively performing a communication of image data between the main body unit B and the HS unit A.

Next, the main body unit B of the facsimile apparatus will be explained.

Numeral 111 denotes a CPU 2, which serves as a control unit of the main body unit B. Numeral 112 denotes a ROM 2 for storing various programs or fixed data of the CPU 2. An SRAM (static random-access memory) 113, which is used for registering and storing registration data (ID (identification) information such as various software switches, communication address data, telephone number or symbol of the apparatus or the like) necessary for the system, is backed up by a battery 125 in order to prevent the loss of data because of interruption of the power supply. It should be noted that demo patterns used for the demonstration according to the present embodiment are stored in the ROM 2. Numeral 114 denotes an image processing unit 2, which serves as an image processing gate array chip having a resolution converting function such as magnification or reduction of images required in image processing of image data executed at the main body unit B side and a binarization processing function for converting multi-level image data into binary image data. Numeral 115 denotes a DRAM 2, which is used as a work memory of the various programs of the CPU 2 or an accumulation memory for accumulating audio data, image data or the like at the main body unit B side.

Numeral 116 denotes a known facsimile modem having functions which are required in standardization of a G3 mode recommended by the ITU-T (International Telecommunication Union-Telecommunication), for transmitting a signal with a modem speed of 9600 bps in case of a facsimile communication, and this facsimile modem has a DTMF (Dual Tone Multiple Frequency) signal recognition function and an audio codec (coder-decoder) function used for recording audio data to the DRAM 2 and reproducing the audio data from the DRAM 2 other than a modulation/demodulation function based on standards V.29, V.21, V.27ter.

Numeral 117 denotes a motor control unit for controlling an original carrying motor used for automatically carrying originals to read images when the HS unit A is used with the main body unit B and a recording sheet carrying motor used for automatically carrying recording sheets in a printer unit. Numeral 118 is a display unit such as LED's (light-emitting diodes), an LCD (liquid crystal display) or the like used for displaying status of the apparatus. Numeral 119 denotes a speaker used for outputting various alarm sounds, a call sound and an audio signal on a telephone line. Numeral 120 denotes an operation unit 2 at the main body unit side of the apparatus including various buttons used for operating the apparatus, the display unit 118 and the speaker. In the present embodiment, as the demonstration, there is performed lighting of the LED's in the operation unit 2, displaying of predetermined character information to the LCD, changing of backlight color of the LCD to various colors, audio outputting of a predetermined message from the speaker or the like. These operations are repeated in accordance with pattern data stored in the ROM 2. Numeral 121 denotes a known NCU (network control unit) as an interface between an analog telephone line and the facsimile apparatus. Numeral 122 denotes a handset used for permitting a user to a speak using the apparatus. Numeral 123 denotes an analog signal connection switch (cross point switch) which is a known circuit for flexibly switching a connection of an analog signal among the handset, the speaker, the NCU and the modem in accordance with setting transferred from the CPU 2.

Numeral 124 denotes a printer unit of the apparatus which is structured by a known printer of an ink discharge system, wherein an image is recorded while moving a cartridge unitedly structured by an ink tank and an ink discharging portion in the main scanning direction of the recording sheet and carrying the recording sheet in the sub-scanning direction. The printer unit 124 can obtain a desired recording result with the predetermined recording resolution according to an ON/OFF operation of ink discharge by selectively equipping a color cartridge structured by combining ink tanks of C (cyan), M (magenta), Y (yellow) and K (black) colors with an ink discharging portion or a monochrome cartridge structured by combining an ink tank of monochrome color with an ink discharging portion. According to the electrical contacting structure of the cartridge, the CPU 2 can discriminate which type of cartridge, color or monochrome, is mounted. Numeral 125 denotes the memory backup battery for backing up registration data in the SRAM. Numeral 126 denotes a sensor for detecting an open/shut status of an upper cover of the apparatus including the operation unit 2. Although the cover has to be opened in case of exchanging the cartridge of the printer unit or separating the HS unit A from the main body unit B, the CPU 2 can recognize the open/shut status of the cover by identifying an output from the sensor 126. Numeral 127 denotes a modular connector used for inserting a cord of physically connecting the facsimile apparatus to the telephone line. Numeral 128 denotes a modular jack used for inserting another edge of the cord in order to connect the facsimile apparatus to a network (an exchange).

Outline of Apparatus

Figure 2:
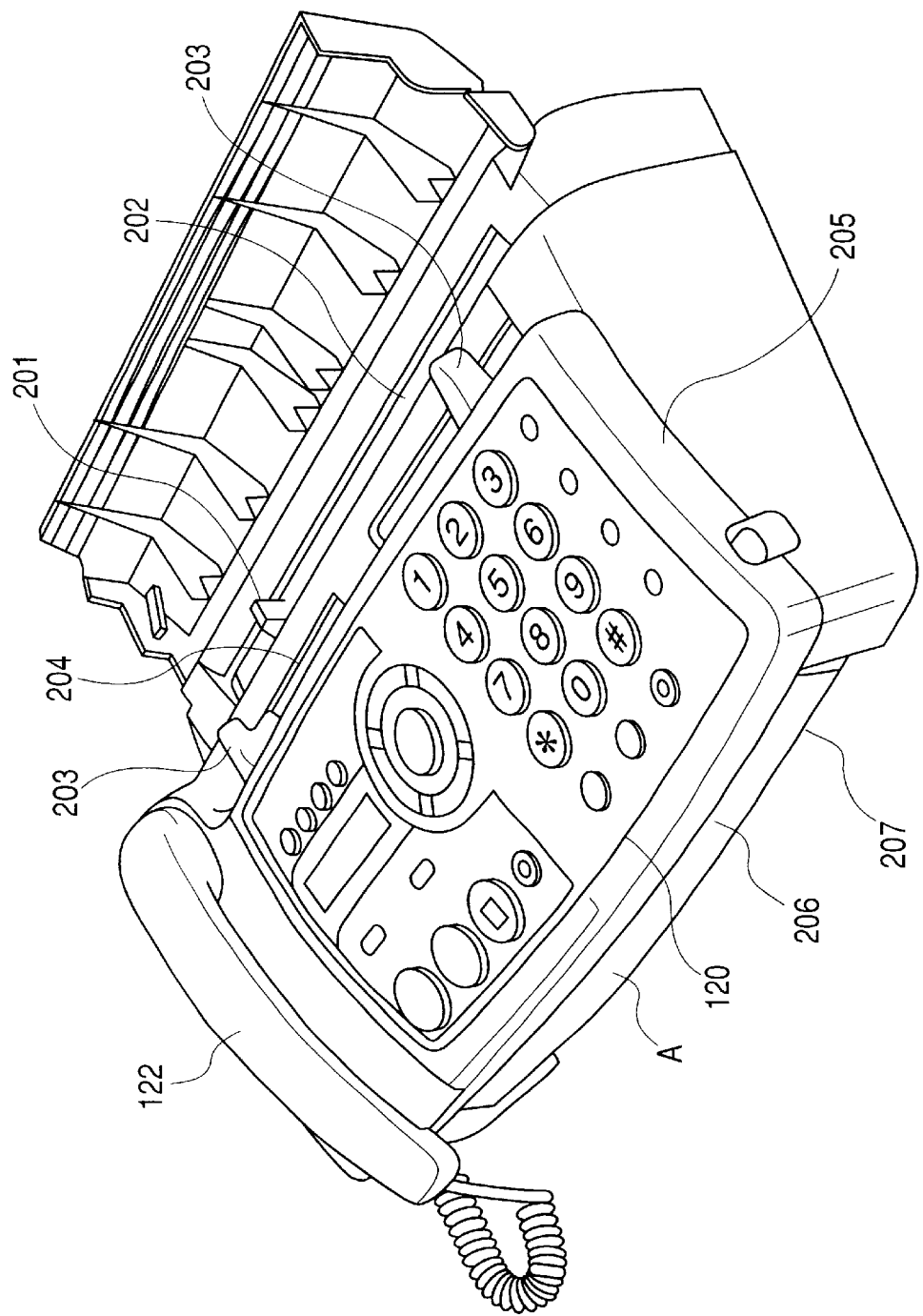
FIG. 2 is a perspective view showing the external outline of the facsimile apparatus.

FIG. 2 is an outline view of the facsimile apparatus shown in FIG. 1. Numerals shown in FIG. 1 are the same as those in FIG. 2.

In FIG. 2, numeral 201 denotes a sheet guide which has a guide mechanism with width adjustment according to the width of a recording sheet on which an image is to be recorded in the printer unit 124. Numeral 202 denotes a sheet entrance, where recording sheets are inserted. Numeral 203 denotes an original guide, of which the width is set according to the width of an original of which an image is to be read by the CS reading control unit 105, in a state in which the HS unit A is used with the main body unit B. A position sensor is added to the guide such that the CPU 2 (111) detects original size according to a set position. Numeral 204 denotes an original entrance, where originals are inserted.

Numeral 205 denotes an upper cover which can be opened in the upper direction when taking out the original and the recording sheet which have jammed during conveyance in the apparatus, or when exchanging the cartridge of the printer unit 124. The upper cover unit includes the operation unit 2 (120) and a handset base on which the handset 122 used in speaking is put. The operation unit 2 (120) includes a ten-key pad including various buttons (in state of off-hook, a backlight is lit, and light colors are changed in accordance with condition), a facsimile transmission start button, a facsimile reception start button, a speaker button, LEDs for informing various modes, an LCD for informing a user of the state of the apparatus or various information using characters or the like, a speaker and the like. A hook switch is provided on the handset base. If the facsimile apparatus is connected to the telephone line by lifting the handset 122, a DC (direct current) loop with an exchange can be formed, and the loop is interrupted by putting the handset 122 on the base. "Connection to the telephone line', mentioned above, means a state capable of performing a communication electrically connecting with the exchange. The facsimile apparatus can detect presence/absence of direct current supplied from the exchange at arbitrary timing in a case where the facsimile apparatus is connected to the telephone line. According to this detection, it is possible to judge whether or not the facsimile apparatus is connected to the telephone line. When the upper cover 205 is opened, the HS unit A can be separated from the main body unit B.

Numeral 206 denotes an original discharging port used for discharging an original which has been subjected to sheet reading (that is, an image on which has been read while the original is moved) with the HS unit A connected to the main body unit B. Numeral 207 denotes a sheet discharge port from where a recording sheet on which an image is printed by the printer unit 124 is discharged.

It should be noted that "connection to the telephone line', mentioned in the description of the present embodiment means that the facsimile apparatus which is physically connected to the telephone line is in a state in which it is capable of electrically connecting to the telephone line, and the apparatus is not always in a state of communicating with a partner side (capturing the line).

Next, processing in a case of performing the demonstration of the facsimile apparatus will be explained. In the demonstration, character information indicating a model name of the facsimile apparatus is displayed on the LCD in the operation unit 2. Then, (1) a backlight is lit, (2) backlight colors (e.g., three colors) are repeatedly changed, (3) LEDs are lit, and (4) audio information representing product information of the facsimile apparatus is output from the speaker. These procedures from (1) to (4) are sequentially repeated. This demo pattern is stored in the ROM 2, but the pattern may be changed according to a predetermined operation. The demonstration is automatically performed under the conditions described later, but it is possible to set the apparatus such that the automatic operation is forcedly prohibited by a predetermined operation performed in the operation unit 2.

A flow chart, shown in FIG. 3 and described below indicates a flow of processing controlled by the CPU 2 on the basis of a control program stored in the ROM 2.

Figure 3:
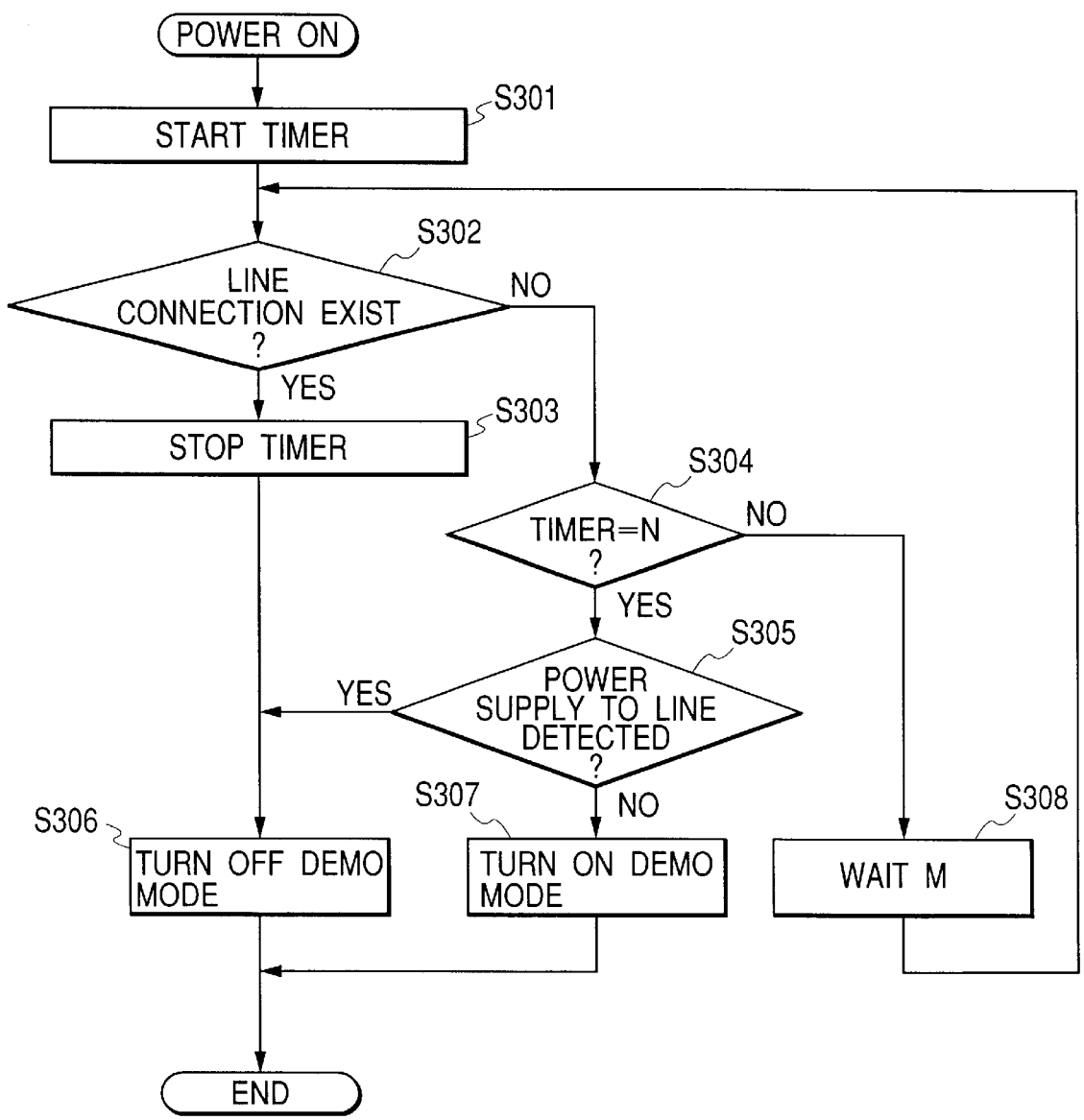
FIG. 3 is a flow chart showing a flow of processing for setting ON/OFF states of a demo mode.

FIG. 3 shows the flow of processing of judging whether or not the facsimile apparatus is connected to the telephone line, that is, switching processing of judging whether or not the demonstration is automatically operated in accordance with a condition that the facsimile apparatus is in an ordinary use state or the facsimile apparatus is in a state of being exhibited in front of a shop.

At first, when the power of the facsimile apparatus is turned on, initializing processing is started, and in a step S301, a timer is initialized to zero to start the count. In the present embodiment, a time unit of the timer is set to N minutes. It is assumed that values of N and M can be varied by a predetermined operation. In an initial state, it is assumed that the demo mode is OFF.

Next, in a step S302, it is judged whether or not the facsimile apparatus is in an ordinary using state, based on whether the facsimile apparatus is connected or not connected to the telephone line. In this judgment, it is judged that the facsimile apparatus is connected to the telephone line by once performing an operation of indicating that the facsimile apparatus is in a state in which it is capable of normally communicating with the network (the exchange). However, a concrete judgment standardization will be described later.

When it is judged that the facsimile apparatus is connected to the telephone line, it is judged that the facsimile apparatus is located at a using destination of a user. Then, the count in the timer is stopped in a step S303, and the demo mode is set to OFF (an indication of the fact that the present demo mode is in the OFF state is stored in the SRAM 113) in a step S306, to terminate this routine.

On the other hand, when it is judged that the facsimile apparatus is not connected to the telephone line in step S302, the flow advances to a step S304, where a judgment is made as to whether or not the value of the timer has reached the set value N. If the timer value has reached the set value N, the flow advances to a step S305, where a judgment is made as to whether or not power supply from the telephone line to the facsimile apparatus can currently be detected through the modular jack 128 and the modular connector 127. This processing is the detection of DC voltage supplied from the network side (the exchange), and if the facsimile apparatus is normally connected to the telephone line, since power is supplied, it is possible to perform a judgment of line connection. Since there is a possibility no judgment has yet been made as to the line connection in a case where the judgment is performed in the step S302, this judgment is performed for the sake of confirmation.

If power supply is detected, the facsimile apparatus is in a state of being connected to the telephone line, and then, similarly to the above description, the demo mode is set to the OFF state in step S306. If the power supply is not detected, the facsimile apparatus is in a state of not being connected to the telephone line, and the demo mode is set to the ON state in the SRAM 113 in a step S307.

In a step S304, if the value of the timer has not reached the set value N, the processing waits a predetermined time M (e.g., one minute), and then the flow returns to step S302, and this routine is repeated until the set value N is ultimately reached while the power is turned on, and as long as it is not judged that a line connection exists.

Like this, in a state it is judged that the telephone line is not connected although the power is turned on, it is judged that the facsimile apparatus is being exhibited at a shop or the like. During this time, it is possible to set the demo mode to an ON state so as to permit a user to start a demonstration operation automatically without performing a complex operation to be performed by a salesperson or the like. Since a switching operation is to be controlled based on measurement by the timer, even if the power is turned on before connection to the telephone line when the user locates the facsimile apparatus, it is nonetheless possible not to start the demonstration operation unnecessarily, because the demo mode is not set to the ON state for a predetermined time.

For a user who does not connect the facsimile apparatus to the telephone line, in order to use it, for example, as a copying machine, or a user who utilizes functions other than a communication function while waiting for installation of the necessary telephone line by a telephone company, it is also possible to set the apparatus such that automatic execution of the demonstration is forcedly inhibited as explained above, thereby preventing unnecessary and unwanted performance of the demonstration procedure.

Figure 4:
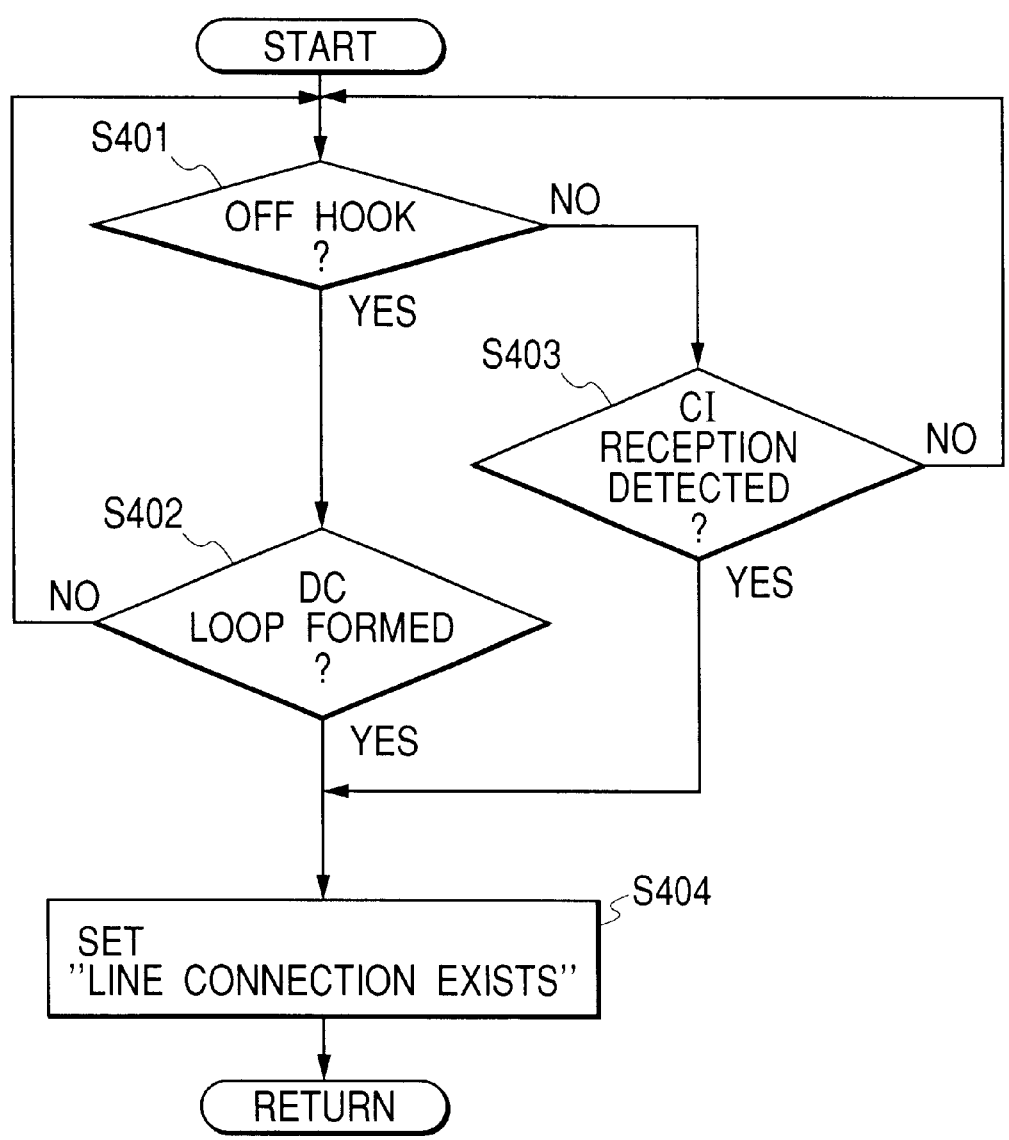
FIG. 4 is a flow chart showing a flow of processing for judging whether or not the apparatus is in a state of being connected to a telephone line.

Next, judgment processing of the line connection executed in step S302 will be explained. FIG. 4 is a flow chart showing a flow of processing for this judgment. This processing is started after power to the facsimile apparatus is turned on, and is repeated until the power is turned off or it is detected that the line connection is completed. This processing is executed in parallel with the flow shown in the flow chart in FIG. 3, and a result based on this processing is provided as a judgment result obtained in the step S302.

With respect to the line connection state, it is assumed that "the line connection does not exist" is set in the SRAM 113 in the initial setting.

When power to the facsimile apparatus is turned on, in a step S401, a judgment is made as to whether the facsimile apparatus is in an off-hook state, that is, whether the hook switch is turned on either by lifting the handset 122 or depressing an off-hook button on the operation unit 2. When it is judged that the facsimile apparatus is in the off-hook state, a judgment is made as to whether or not the DC loop is formed between the facsimile apparatus and the exchange in a step S402. When the DC loop is formed, this fact means that the facsimile apparatus is connected to the telephone line, and the contents in a memory area storing the line connection state in the SRAM 113 is rewritten to "the line connection exists", to set this state in a step S404.

That is, when the DC loop is formed between the facsimile apparatus and the exchange due to polarity inversion according to the off-hook operation, this fact means that the facsimile apparatus is connected to the telephone line, and when the user performs this off-hook operation for facsimile transmission or for voice communication, the above judgment is executed. When it is once set that the line connection exists, the above state is held as long as the power is not turned off, and the processing is terminated. Generally, since power to the facsimile apparatus is always turned on, the above state is basically maintained. However, for a user who has power to the facsimile apparatus turned off during the night or the like, the demonstration operation may be set by the operation unit 2 or the like such that the demonstration procedure is not performed after the location of the facsimile apparatus.

In the on-hook state, in a step S403, a judgment is made as to whether a call signal (CI (callable interface) signal) from the network has been received. When a CI signal is detected, this means that the facsimile apparatus is connected to the telephone line, and "the line connection exists" is set in step S404, similarly to the above-mentioned case.

That is, when the facsimile transmission or dialing for voice communication is conducted from the partner side, the call signal is sent through the exchange, and the judgment of existence of the line connection can be performed by detecting the sent call signal.

In a case where formation of the DC loop or detection of the CI signal cannot be performed, this means that the facsimile apparatus is not connected to the telephone line, and the observation for the above-mentioned judgment is continued until "the line connection exists" is set.

The judgment in the foregoing step S302 is performed by reading the contents in the memory area storing the line connection state in the SRAM 113 based on the above processing.

As will be apparent from the above procedures, since existence of the line connection is judged by a general operation of the facsimile apparatus or by a receiving operation, the obtained result can be reflected in a judgment as to whether or not the demonstration has to be automatically performed, without an accompanying complex operation.

Figure 5:
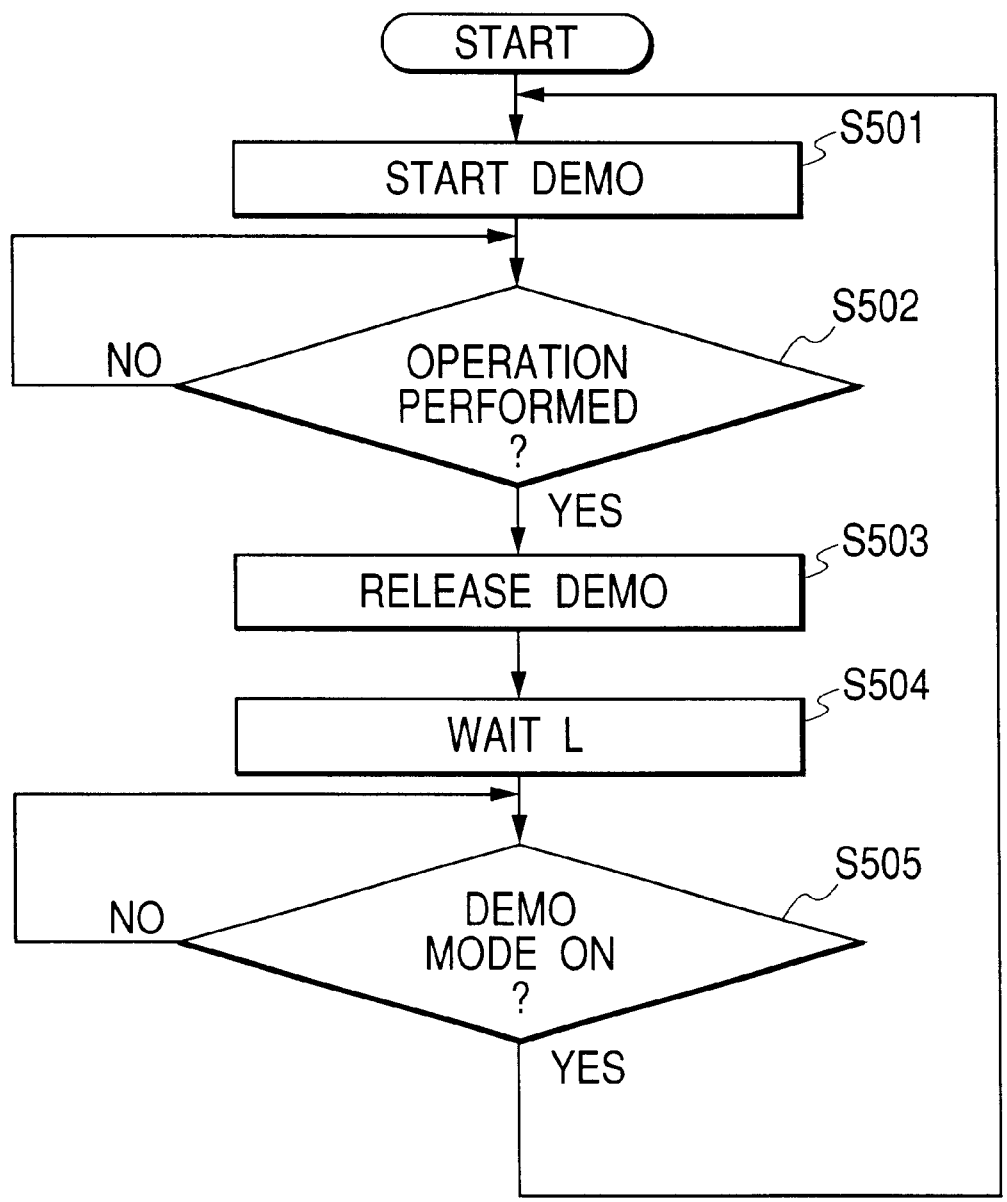
FIG. 5 is a flow chart showing a flow of processing related to start and stop of the demonstration.

Next, processing related to the demonstration when the demo mode is set to an ON state in the above step S307 will be explained. FIG. 5 is a flow chart showing the flow related to that processing.

At first, when the demo mode is set to the ON state, the demonstration according to predetermined demo patterns as explained in the above is started, in a step S501.

Then, in a step S502, a judgment is made as to whether or not the facsimile apparatus is operated by an operator. It is assumed that an operation to be performed in this time means a manual operation such as depression of keys, buttons or the like included in the operation unit 2, and an operation of the hook switch to be performed at the main body unit B side by lifting of the handset 122, and does mean the extraction of the HS unit A, or an operation performed in the operation unit 1. In this operation, an exclusive key or the like for releasing the demonstration is not provided. That is, a mechanism for an operation to be performed for another purpose is also utilized in releasing the demonstration operation. Therefore, there is no need to provide an extra button or the like to be used for releasing the demonstration operation, and a user is not required to perform an extra operation for the release.

When it is judged that the facsimile apparatus itself is being operated, the demonstration is released in a step S503. That is, the demo patterns are stopped, and the facsimile apparatus is to be set to an ordinary standby state.

After waiting for a predetermined time of L minutes (L can be varied by a predetermined operation) from the last operation in step S504, a judgment is made as to whether or not the demo mode is set to an ON state, in a step S505, and if the demo mode is set to the ON state, the flow returns to step S501, where the demonstration is restarted.

Accordingly, the demonstration is to be performed when an operator does not operate the facsimile apparatus, and when the operator performs operation, that operation is not (and cannot be) prevented. Since the demonstration is released by an operation used in ordinary use, the apparatus can be structured cheaper as compared with an apparatus having such exclusive key. Even if a user, who wants to look at an image obtained by only the hand scanner, performs the related operation, since the demonstration is not stopped, the effect of the demonstration is not spoiled. However, of course, the demonstration may be stopped by an operation of the handset operating with the CPU 1. This is possible in that a releasing method of the demonstration operation is selected in advance by using the operation unit 2 or the like, and the selected releasing method is stored in the RAM.

It should be noted that even if the demo mode is set to the ON state, a function such as a copying function can be used as usual, and although an operation for transmission is not performed in actuality, the conveyance or the like of an original is performed. Therefore, operation as for reception (so to speak, a pseudo-reception) can be experienced.

As described above, according to the present embodiment, the demonstration for the purpose of easily getting an advertizing effect can be performed using an inexpensive structure without compelling an operator to perform a complex operation. Furthermore, since the demonstration is not be performed, or is to be stopped, when it is not required, it is possible to prevent the described functionalities presenting inconvenience to an operator who performs the demonstration operation or an operation by a user who performs a trial operation.

The present invention is applicable to a system composed of plural pieces of equipment (e.g., a host computer, an interface equipment, a reader, a printer, a communication unit and the like) or to an apparatus including a single piece of equipment (e.g., a facsimile apparatus, an E-mail communication apparatus or the like).

It is also included in a category of the present invention that the program codes of software for realizing the functions of the above-described embodiments is supplied to a computer in the apparatus connected to the various devices or the system so as to operate the various devices in order to realize the functions of the above-described embodiments and then the various devices are operated in accordance with the program stored in the computer (or CPU or MPU) in the system or the apparatus, thereby executing the embodiments.

In this case, the program codes themselves of the software realize the functions of the embodiments, and the program codes themselves and means for supplying the program codes to the computer, for example, the storage medium storing such program codes, constitute the present invention.

The storage medium storing the program codes can be, for example, a floppy disk, a hard disk, an optical disk, a magnetooptical disk, a CD-ROM, a magnetic tape, a non-volatile memory card, a ROM or the like.

It is needless to say that the program codes are included in the embodiments of the present invention not only in a case where the functions of the embodiments are realized by executing the supplied program codes using the computer, but also a case where the program codes cooperate with an OS (operating system) functioning on the computer or another application software, thereby realizing the functions of the embodiments.

Further, it is needless to say that the present invention includes a case where the supplied program codes are once stored in a memory provided in a function expansion board in the computer or a function expansion unit connected to the computer, and a CPU or the like provided in the function expansion board or the function expansion unit executes all the process or a part thereof according to the instruction of such the program codes, thereby realizing the functions of the embodiments.

As above, the present invention has been explained on the basis of the preferable embodiment. However, the present invention is not limited to the above-mentioned embodiment, but may be modified in various manners within the scope of the following claims.

What is claimed is:

1. A data communication apparatus comprising:

connection means for performing connection to a telephone line;

storage means for storing demo patterns used for performing a demonstration operation;

setting means for setting a demo mode used for performing the demonstration operation on the basis of the demo patterns stored in said storage means;

judgment means for judging whether or not said connection means is connected to the telephone line; and control means for performing a control so as to set the demo mode by using said setting means in a case where it is judged that said connection means is not connected to the telephone line by said judgment means.

2. An apparatus according to claim 1, further comprising first time measuring means for measuring time elapsed from when the power was turned on, wherein said control means controls to set the demo mode by using said setting means in a case where it is judged that said connection means is not connected to the telephone line by said judgment means after said first time measuring means measured a predetermined time.

3. An apparatus according to claim 1, wherein the demo patterns include the demonstration operation according to display or sound.

4. An apparatus according to claim 1, wherein said control means releases the demo mode set by said setting means in accordance with a predetermined operation.

5. An apparatus according to claim 4, further comprising second time measuring means for measuring time elapsed from when the demo mode was released, wherein said control means controls to reset the demo mode by using said setting means in a case where it is judged that said connection means is not connected to the telephone line by said judgment means, and any operation is not performed after said second time measuring means measured a predetermined time.

6. A control method of a data communication apparatus for performing a data communication through a telephone line, said method comprising:

a setting step of setting a demo mode used for making the data communication apparatus perform a predetermined demonstration operation;

a judgment step of judging whether or not the data communication apparatus is connected to the telephone line; and a control step of controlling to set the demo mode in said setting step in a case where it is judged that the data communication apparatus is not connected to the telephone line in said judgment step.

7. A computer-readable program used for controlling a data communication apparatus for performing a data communication through a telephone line, comprising:

a setting step of setting a demo mode used for making the data communication apparatus perform a predetermined demonstration operation;

a judgment step of judging whether or not the data communication apparatus is connected to the telephone line; and a control step of controlling to set the demo mode in said setting step in a case where it is judged that the data communication apparatus is not connected to the telephone line in said judgment step.

* * * * *

UNITED STATES PATENT AND TRADEMARK OFFICE
CERTIFICATE OF CORRECTION

PATENT NO. : 6,647,102 B2
DATED : November 11, 2003
INVENTOR(S) : Yoshiyuki Hirai et al.

It is certified that error appears in the above-identified patent and that said Letters Patent is hereby corrected as shown below:

Title page,
Item [73], Assignee, "Canon, Inc., Tokyo (JP)" should read -- Canon Kabushiki Kaisha, Tokyo (JP) --.

Column 3,
Line 50, "to a" should read -- to --.

Column 4,
Line 54, "line'," should read -- line", --.

Column 5,
Line 4, "line'," should read -- line", --; and
Line 33, "operated" should read -- operated, --.

Column 8,
Line 38, "is not be" should read -- is not to be --; and
Line 51, "is" should read -- are --.

Signed and Sealed this

Seventh Day of February, 2006

JON W. DUDAS
*Director of the United States Patent and Trademark Office*